Patented May 31, 1932

1,860,601

UNITED STATES PATENT OFFICE

ROYAL C. STEADMAN, OF WASHINGTON, DISTRICT OF COLUMBIA, DEDICATED, BY ASSIGNMENT, TO THE GOVERNMENT AND THE PEOPLE OF THE UNITED STATES OF AMERICA

PROCESS FOR REENFORCING MODELS OF FRUIT OR OTHER OBJECTS MADE OF WAX OR SIMILAR FUSIBLE MATERIAL

No Drawing.     Application filed February 6, 1930.   Serial No. 426,433.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government, for governmental purposes, without payment of any royalty thereon.

This invention relates to a process or method of reinforcing models of fruit or other objects made of wax or other fusible material, by reenforcing the walls of the model so that it does not become distorted when subjected to an unusual degree of heat, and renders the model less liable to breakage. It also provides a ready means of approximately the weight of the natural object, as well as retaining the shade or color of the finished specimen. This new process is considered to be an important step forward in the development of fruit models, and at small expense.

The procedure in reenforcing models of fruit or other objects made of wax is to inject into the stem end of the model, in the case of fruits, or in some inconspicuous place in other models, two holes made through the wall into the inner cavity, one sufficiently large to permit the pouring of a thin paste; the other very small to serve merely as an air vent. Plaster of Paris, to which water has been added in sufficient quantity, to make a thin paste of the proper consistency, is poured, while still in a more or less semifluid state, through the larger hole into the cavity of the model. Enough of the paste is introduced to give, when properly distributed, a uniform inner casing or lining to the model of the desired thickness. In the case of apple models a thickness of 1/8 to 3/16 of an inch has been found satisfactory. When enough of the paste has been introduced, the holes are quickly plugged and the model is rotated, preferably in the hands, in order to distribute the plaster of Paris evenly over the inner surface of the model. When "set", the plaster of Paris forms a hard inner shell or lining adhering closely to the interior of the model.

I used plaster of Paris, but any other material such as concrete, which has the power of setting firmly, may also be used.

I have found that wax models stored at a very high room temperature, or if placed near heated steam pipes or hot water radiators, or if they happen to be placed for a short time where the direct rays of the sun strikes them, will become misshapen as a result of softening, and therefore valueless, unless my process is used.

I claim:

1. A process for reenforcing models of wax fruit which consists in injection of self-hardening non-thermoplastic material.

2. A process for reenforcing wax fruit which consists in puncturing holes through the wall of the model into the inner cavity, one large enough to serve as an air vent the other sufficiently large to permit the pouring of a self-hardening non-thermoplastic material in sufficient quantity to give a uniform casing or lining, plugging the holes, rotating the said model to distribute evenly the said material over the inner surface.

3. An imitation of a natural object comprising a continuous integral hollow casting of a self-hardening non-thermoplastic material and a coating of wax adhering to said casting having color applied thereto.

4. An imitation of a natural object comprising a continuous integral hollow casting of wax having color applied thereto which has been reinforced by the injection of self-hardening non-thermoplastic material.

ROYAL C. STEADMAN.